United States Patent [19]
Sandlin, Jr. et al.

[11] Patent Number: 5,808,536
[45] Date of Patent: Sep. 15, 1998

[54] POWER TRANSFORMER AND COUPLING MEANS THEREFOR

[75] Inventors: Isaac J. Sandlin, Jr., Beulaville; Hyeong Jin Sim; Jerry Woodward, both of Raleigh, all of N.C.

[73] Assignee: General Signal Corporation, Stamford, Conn.

[21] Appl. No.: 673,266

[22] Filed: Jun. 28, 1996

[51] Int. Cl.⁶ .......................... H01F 27/04; H01B 17/26; H02G 15/28
[52] U.S. Cl. ................ 336/107; 174/11 BH; 174/152 R; 174/14 BH; 174/15 BH
[58] Field of Search .................... 336/107; 174/DIG. 10, 174/11 BH, 12 BH, 14 BH, 152 R, 138 F, 5 R, 5 SB

[56] References Cited

U.S. PATENT DOCUMENTS

| | | | |
|---|---|---|---|
| 3,462,645 | 8/1969 | Leonard | 336/107 |
| 3,767,843 | 10/1973 | Stone | 174/152 R |

FOREIGN PATENT DOCUMENTS

| | | | |
|---|---|---|---|
| 348-131 | 6/1989 | European Pat. Off. | 336/107 |
| 63-9911 | 1/1988 | Japan | 336/107 |

OTHER PUBLICATIONS

GE Medium Transformer, Primary Substation Transformer from GE, GEA 12217, Oct. 1993.
Article for Loadbreak Bushing Insert: Electrical Apparatus 500–12, by Cooper Powers Systems: Transmission Distribution, Electrical Apparatus Specifiers Catalog, Jan. 1990, vol. three, pp. 1–2.

*Primary Examiner*—Michael L. Gellner
*Assistant Examiner*—Anh Mai
*Attorney, Agent, or Firm*—Ohlandt, Greeley, Ruggiero & Perle

[57] ABSTRACT

A power transformer is provided with a housing having a plurality of apertures for receipt of a bushing well of a bushing assembly. Each bushing assembly includes a bushing well adapted to be secured in one aperture of the power transformer, and a bushing adapted to be connected to a terminal in the bushing well to permit the conducting of electric current between the bushing assembly and the transformer. The bushing assembly further includes a connector for connecting the bushing conductor to a terminal positioned in the bushing well. The power transformer may include a cap to cap the unused bushing wells. The cap is, preferably, a plate structure that attaches to the lip of the bushing well and uses the dielectric formed by the air enclosed by the cap and the bushing well to prevent sparking over to adjacent sites and corona discharge, to prevent accidental contact with the live terminal therein, and to guard against contamination of the well.

7 Claims, 4 Drawing Sheets

POWER TRANSFORMER AND COUPLING MEANS THEREFOR

The present invention relates to power transformers. More particularly, this invention relates to a universal power transformer that includes an internal design to produce one or more sets of live bushing locations, and a coupling means for easy attachment and detachment of bushings to and from the power transformer. The present invention further includes means for capping unused bushing wells in a power transformer, thus allowing the use of a single transformer in many different substations. Accordingly, the present invention provides coupling means for a power transformer such that the power transformer will have the flexibility heretofore associated with distribution transformers.

BACKGROUND OF THE INVENTION

A grid of power lines typically distributes electricity. These power lines spread out from a main generator station and convey the electricity to numerous substations. The low voltage of this electricity is stepped up for efficient conducting of electric power. Each substation contains a power transformer that is used to step down the voltage to lower levels for subsequent conducting through a distribution network. The distribution network has numerous smaller distribution transformers, which lower the voltage of the electricity conveyed to households or other end users. Conventionally, the input voltage is called the primary voltage and the output voltage is called the secondary voltage.

Thus, there are two types of transformers used to convey electricity from a transmission system to a distribution system. These transformers are power transformers and distribution transformers.

Power transformers, which are used in the substations, must process far greater influxes of electric current and voltage than distribution transformers. Each substation has a unique layout so that the power transformers are normally designed to conform to a unique substation specification. Thus, it is difficult to utilize a power transformer from one substation in another substation, even within the same utility's distribution system.

On the other hand, distribution transformers are designed for much lower levels of electrical power. Distribution transformers are typically much smaller in size and are not usually constrained by the installation site. In fact, most distribution transformers are mounted on utility poles, on ground level pads or placed under ground. Due to the lack of design constraints, distribution transformers have a standardized design, and are, thus, readily substitutable.

Heretofore, the prior art has failed to provide a similar flexibility for power transformers. Thus, there is a need for a universal power transformer. Such a universal power transformer would reduce potential outage time since suitable replacements would be more readily available. It would reduce the cost associated with new substations, as well as the transformer itself, since the location of bushings on the power transformer would be standardized. It would reduce the number of spare transformers needed to ensure system reliability, and would permit relocation of power transformers from one substation to another. Such a universal power transformer must have the ability to connect adequately and safely to the cables transferring power to and from the distribution networks.

Since each substation has a unique layout, the universal power transformer must be able to connect to electrical power cables located in a variety of configurations. When a power transformer is designed for an individual substation, the particular power transformer is built to address the particular design concerns. Thus, for the power transformer to be useful in more than one environment, it must be capable of accepting cable connections at multiple locations on its exterior.

Accordingly, the present invention provides multiple sets of bushing wells seated in apertures in the power transformer housing to provide this desired flexibility. Once a connection is made to an existing substation, the remaining open bushing wells can be capped to protect them from contamination, to provide protection against accidental contact with the live terminal at the base of the well, and to prevent corona activity from the live terminal. Potential contamination prevented by the cap can include birds or other small animals seeking shelter or nesting in the wells.

The present invention discloses multiple live connection sites requiring no switching. Thus, within the power transformer of this invention, multiple sets of permanent low voltage connections are made. Unused sites are effectively capped in accordance with the disclosure of the invention. No method of switching between the permanent connections is required.

Furthermore, distribution transformer bushing assemblies typically require a push-fit between the bushing and the bushing well to expel all air between these connecting parts to prevent corona activity. Oftentimes a gap-filling lubricant is used to ensure a tight fit. The present invention discloses a unique air gap between the bushing and the bushing well of a minimum volume sufficient to accommodate the incident thermal expansion and to prevent corona activity.

SUMMARY OF THE INVENTION

Against the foregoing background, it is a primary object of the present invention to provide a power transformer that has greater flexibility for use in different substations within a power distribution system.

It is another object of the present invention to provide such a power transformer that provides a plurality of apertures or sets of apertures in its housing, with each aperture adapted to receive a bushing well so that the power transformer can be readily used in a number of different substation configurations.

It is a further object of the present invention to provide such a bushing assembly that has an air gap between the bushing and the bushing well sufficient to act as a dielectric between said bushing, said bushing well, and the grounded tank mounting surface without incidence of corona activity in the air gap.

It is a further object of the present invention to provide a bushing well that is sunken essentially entirely within the insulating fluid space within the power transformer to increase the insulating capacity of the bushing well on the transformer side.

It is a still further object of the present invention to provide such a power transformer with a plurality of bushing assemblies that have a biased or spring loaded coupling means attached to the bushing conductor terminal to facilitate connection of the bushing and the terminal at the base of the bushing well.

It is yet a further object of the present invention to provide such a power transformer having a plurality of live bushing wells therein that can be readily capped to protect them from contamination, to provide protection against accidental contact with the live terminal at the base of each bushing well, and to guard against the incidence of corona activity generated by the live terminal in the bushing well.

To the accomplishment of the foregoing objects and advantages, the present invention, in brief summary, comprises a power transformer having a plurality of apertures in its housing for receipt of a bushing well of a bushing assembly. Each bushing assembly includes a bushing well adapted to be secured in, and preferably sunken into, one aperture of the power transformer housing, and a bushing adapted to be connected to the bushing well to permit the conducting of electric current thereto. A gap between the walls of the bushing well and the bushing provides additional insulation. The bushing assembly further includes releasable means for coupling the bushing to an electric current terminal preferably positioned in the bushing well.

The power transformer further comprises means for capping the unused bushing wells. The capping means is, preferably, a plate structure that attaches to the lip of the bushing well and uses the dielectric formed by the air enclosed by the cap and the bushing well as insulation to prevent corona activity or other unwanted electrical discharge, to prevent contamination and to guard against accidental contact with the live terminal therein.

DESCRIPTION OF THE PREFERRED EMBODIMENTS

Figure 1:
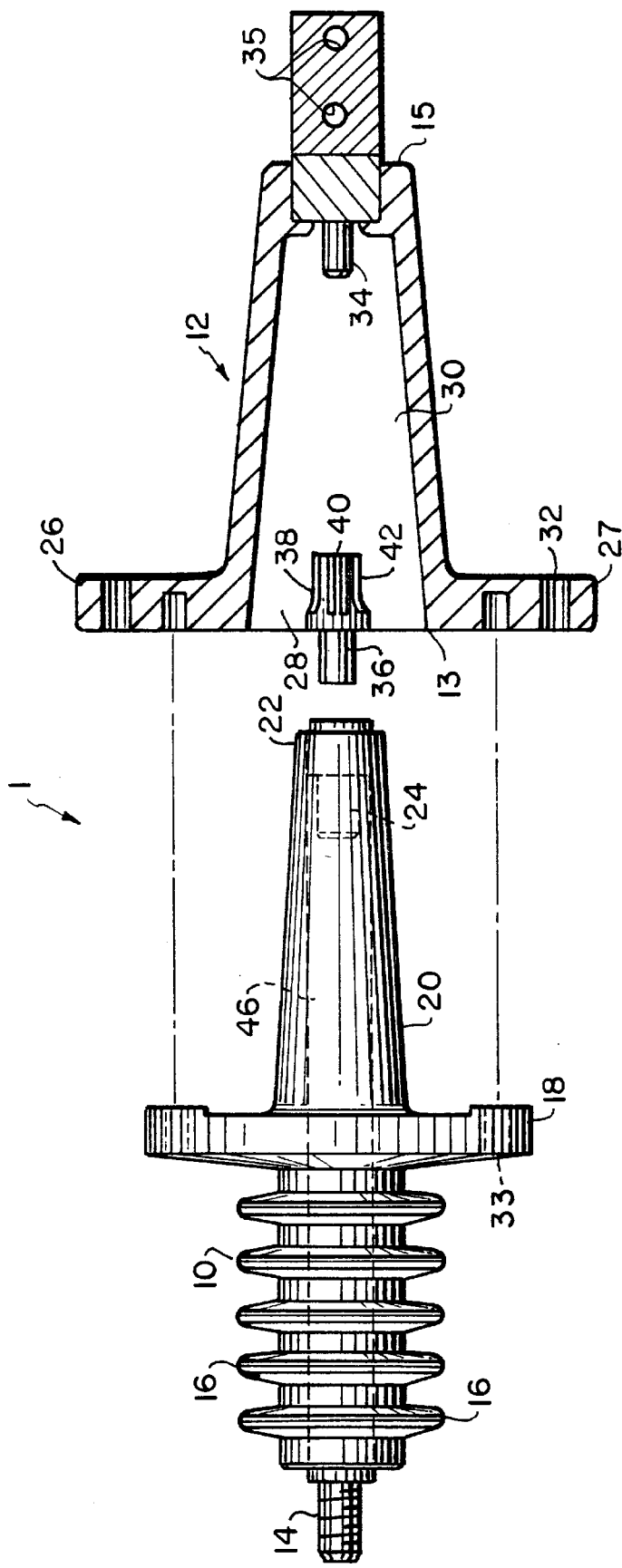
FIG. 1 is a side schematic view of an unassembled coupler assembly of a first embodiment of the present invention.

Referring to the figures and, in particular, FIG. 1, there is provided a bushing assembly generally referred to as reference numeral 1. The bushing assembly 1 has a bushing (or bushing insert) 10 and a bushing well 12 adapted to receive the bushing.

The bushing well 12 has, in this embodiment, a conically shaped body with a conically shaped cavity 30. The body has a first end 13 that includes an annular lip 26 having a central aperture 28 therethrough, and a second opposite end 15 having a terminal 34 preferably molded in place. The annular lip 26 of the bushing well 12 has a plurality of bores 32 therethrough.

The base 27 of the annular lip 26 will seat against a mounting boss 37 (see FIG. 2) on the exterior wall 45 (see FIG. 3) of the power transformer housing 52, effectively sinking the body of bushing well 12 into the power transformer and into the insulative oil, air or other gas contained therein. Only the outermost section of the well, immediately interior of the lip 26, would not be situated within the body of the power transformer and in insulative contact with the fluid in the power transformer.

The inside of the cavity 30 of the bushing well 12 has a conical shape that tapers inward in approximate conformance to, but spaced from, a tapered body portion 20 of the bushing 10. The spacing of the inner surface of the bushing well 12 from the tapered body portion 20 of the bushing 10 provides a minimum volume of air surrounding the tapered body portion 20 that is not expelled when the bushing 10 is pressed into the bushing well 12. This volume of air functions as a dielectric to properly insulate the connection made between the bushing 10 and the bushing well 12 to prevent corona activity and corona creep along the bushing. It also functions as a cushion to accommodate the different thermal coefficients of expansion of the materials of the bushing assembly.

The terminal 34 of bushing well 12, which preferably is not threaded, extends into the cavity 30 through the second end 15 of the bushing well 12. The terminal 34 will ultimately conduct electrical power transferred to it from the internal lead of the transformer windings and transfer it via the coupler or connector 38 to the bushing conductor 46. Power transfer in the reverse direction, from the bushing conductor 46 to the transformer windings, is also possible via such a coupler 38. The terminal 34 has a plurality of holes 35 formed in the internal end thereof to provide attachment sites for cables or other means of conducting electrical power between the transformer winding and the terminal. Thus, in the context of the present invention, cables can be traditional electrical cables, bus systems, or any other current carrying members.

For the universal power transformer, there will be a number of sets of apertures about the body of the power transformer. Each aperture in the transformer housing is adapted to receive a bushing well 12. As discussed above, the power transformer housing will have a number of such sets of apertures for receipt of the bushing wells 12 so that the power transformer will have the ability to be adapted to existing substations and, thus, a variety of differently configured substations. As will be discussed below, the unused live bushing wells will need to be capped in order to avoid contaminating the unused wells, to provide protection against accidental contact with the live terminal at the base of the well, and to prevent corona activity and discharge. As referred to herein, a live bushing well contains a live terminal; a live terminal is one that is electrically charged due to its connection with the windings of the transformer interior.

Referring again to FIG. 1, the bushing 10 has a central annular flange 18 and a tapered body portion 20 that extends from the flange and terminates at tip 22. The tip 22 of the tapered body portion 20 has an aperture 24 formed within conductor 46 therein. The bushing 10 also includes a plurality of circumferential ribs 16 on the opposite side of the flange 18 from tapered portion 20, that provide a greater electrical creep path required for electrical clearance in the uncontrolled environment external to the bushing well. The bushing 10 terminates at its distal end in a terminal 14. The terminal 14 preferably is threaded, and is adapted to attach to an incoming electrical cable connector (not shown). Electric current passes through the bushing 10 and the conductor 46 therein by conventional means known in the art.

The flange 18 has a plurality of bores 33 that, when the bushing 10 is positioned in the bushing well 12, align with the plurality of bores 32 of the lip 26 of the bushing well. The aligned bores 32 of the lip 26 and the bores 33 of the flange 18 are adapted to attach the bushing 10 to the bushing well 12, via bolts, clamps, or other conventional means. As discussed below, bores 32 are alternatively used to attach a cap to bushing well 12. An additional set of bores 35 of the lip 26 (see FIG. 2) are used to mount the bushing well 12 to the mounting boss 37 of the power transformer.

The bushing 10 is composed of insulative material, such as porcelain or epoxy or other insulating compound, that surrounds a conductor 46. Terminal 14 and conductor 46 are made of conductive metal or other suitable material.

The coupler 38 is adapted to be secured within aperture 24. Preferably, the aperture 24 is threaded and adapted to receive a threaded portion 36 of coupler 38. In this preferred embodiment, the opposite end of coupler 38 has a frictional mount 40 that is designed to be pushed onto the terminal 34 to provide engagement between the bushing 10 and the terminal of the bushing well 12.

The frictional mount 40 has a tube-shaped wall 42 that is deformable and biased inward to provide adequate frictional attachment to terminal 34. In one embodiment, the wall 42 may be solid. Alternatively, the wall 42 may be composed of separate biasing fingers 43 (see FIG. 4). In addition, the coupler 38 may be integral or may consist of two independent parts. In a further preferred embodiment, the coupler 38 is a tulip connector. However, the coupler 38 can be any connector that has means, preferably threaded, for mating with aperture 24, and biasing or spring means that permit the coupler to connect readily to the terminal 34.

A variety of couplers can be substituted in these designs for tulip connector 38. Equivalent connectors known in the art include crimp pins and louvertac- and multilam- type bands, including those having spring-loaded or biased arm elements. In some such designs, the friction-based attachment is supplemented with additional clamping or other securing means. The coupler 38 provides an adequate contact pressure, but is easily released, and is suited for use in a power transformer that handles higher current and voltage.

In this preferred embodiment, the bushing well 12 is composed of filled epoxy materials. Various formulations are available and are selected based on cost, manufacturability, and their physical and electrical performance. Also, the bushing well 12 is spaced from the bushing 10, in contrast with prior art bushing assemblies for distribution transformers having tightly fit bushing-to-bushing well contact. The structure according to the present invention incorporates an air gap 50 (see FIG. 2) between bushing well 12 and bushing 10, yet provides adequate insulation for the very high level of voltage transfer that must be insulated and the ensuing corona activity.

Figure 2:
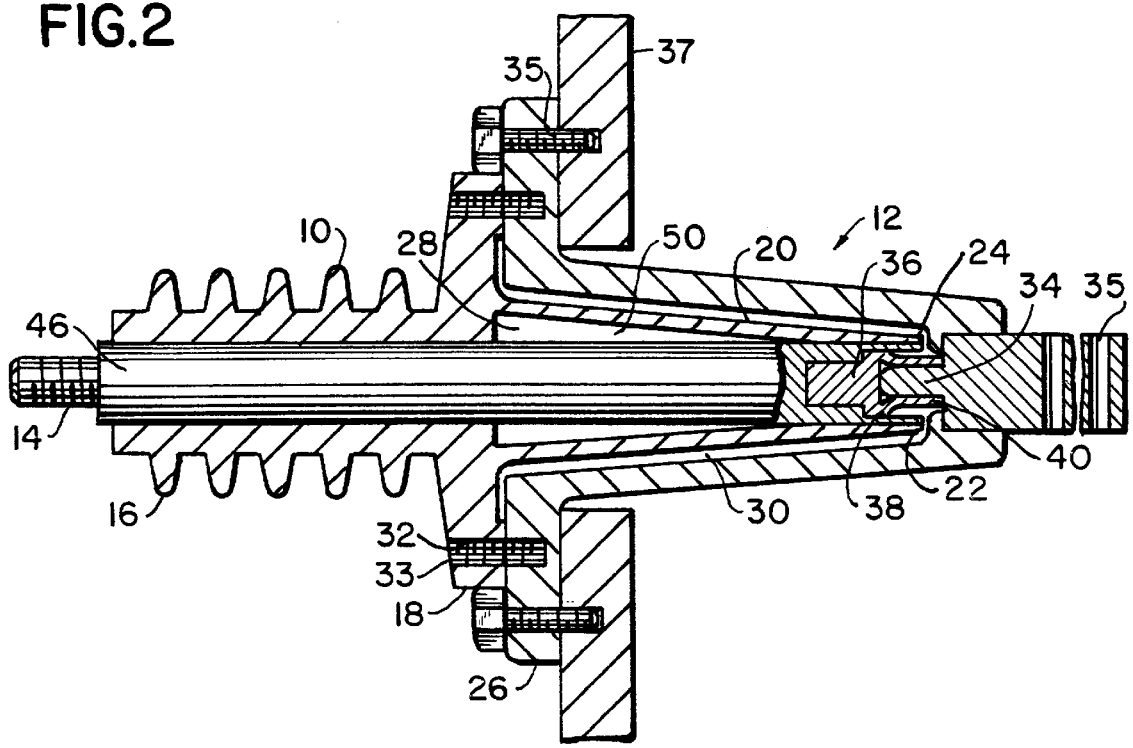
FIG. 2 is a side schematic view of the coupler assembly of FIG. 1, as assembled.

FIG. 2 shows the bushing 10 and the bushing well 12 in full engagement. The bores 32 of the lip 26 of the bushing well 12 and the bores 33 of the flange 18 of the bushing 10 align to allow the lip and flange to be attached together by conventional means, such as, for example, bolting, clamping or the like. Gaskets 39 (shown in FIG. 3) are placed between the lip 26 and the power transformer mounting boss 37, and alternatively between the lip 26 and the flange 18, or between the lip 26 and the cap 44, depending on whether the well 12 is actively connected or capped. The outer surface of the flange 18 can be designed, as shown, to provide a flat surface for bolting or other connection. The conductor 46 is shown in its location within bushing 10. The power transformer body can also have cooperating mounting bosses 37 or other means for mounting the assembly to and through its surface 45.

FIGS. 3–5B show an alternate preferred embodiment of the bushing well 12 of the present invention. This structure varies from that of FIGS. 1 and 2 primarily in that its inner cavity 30 does not taper. The well walls form a generally cylindrical cavity as opposed to a frustoconical cavity. This allows the cavity 30 to conform to a non-tapered bushing 10 (see FIG. 4) and still provide the minimum of air dielectric between the bushing well 12 and the bushing 10 needed to prevent corona activity, primarily corona discharge. Thus, the well 12 is designed to conform to the shape of the bushing 10.

Figure 3:
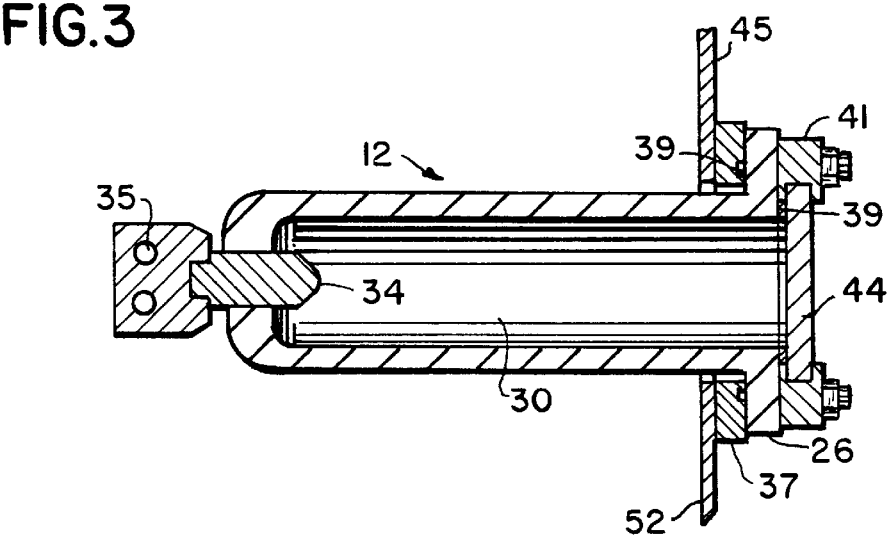
FIG. 3 is a schematic view of a bushing well and well cap of a second embodiment of the present invention.
Figure 6:
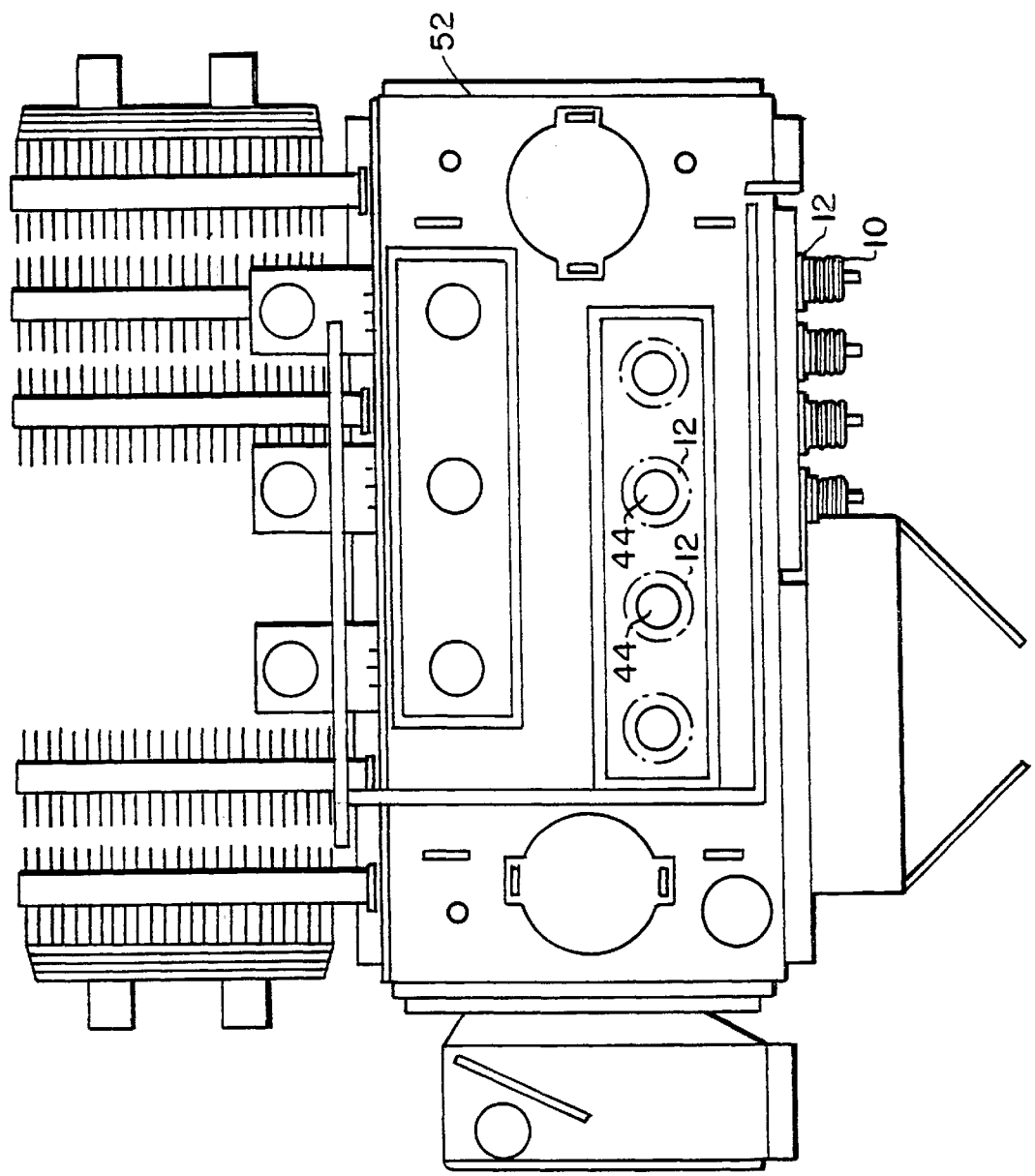
FIG. 6 is a diagram of a preferred electrical power transformer of the present invention demonstrating four sets of bushing wells, three sets of insulating well caps, and a set of low voltage bushings installed in one of the sets of bushing wells.

In addition, the well cap 44 is depicted here, in the absence of the bushing 10. The utility of the well cap 44 is not limited to the embodiment of FIG. 3. The well cap 44 is used on all bushing wells 12 not containing bushings 10. When well cap 44 is placed over the lip 26, it safely seals off live bushing well 12. Significantly, due to the size of cavity 30, the air contained within it, when sealed in by well cap 44, is sufficient to act as a dielectric to prevent sparking over to adjacent sites. This obviates the need for the insertion of a dielectric mass within bushing well 12 when not in use. The well cap 44 is preferably a flat plate having a surface that mates with lip 26. However, the well cap 44 can be any structure that closes or caps the unused bushing well 12. As shown in FIGS. 3 and 6, the well cap 44 may be a rounded cap having a central peak.

Figure 4:
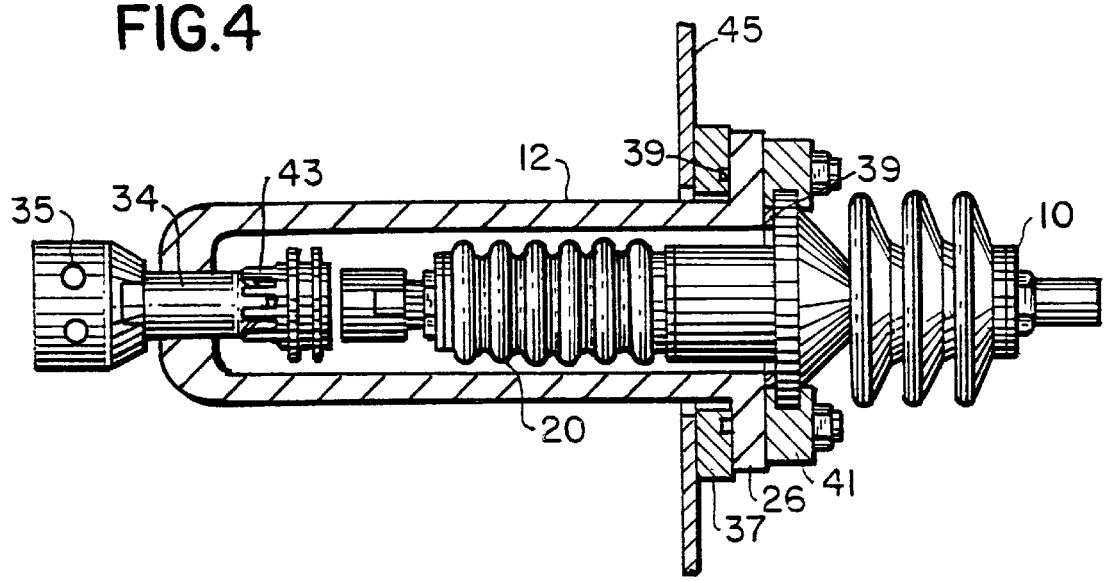
FIG. 4 is a schematic view of the bushing well of FIG. 3 attached to a further preferred embodiment bushing.

FIG. 4 depicts the gasket 39 disposed between the mounting boss 37 of the power transformer wall 45 and the lip 26 of the bushing well 12. A second gasket 39 is placed between the bushing flange 18 and the lip 26. Clamps 41 are used to affix the well cap 44 to the lip 26. FIG. 4 also shows the bushing well 12 of FIG. 3 with the associated bushing 10 connected thereto. Tulip connector 38 is connected by frictional engagement with terminal 34.

Figure 5A:
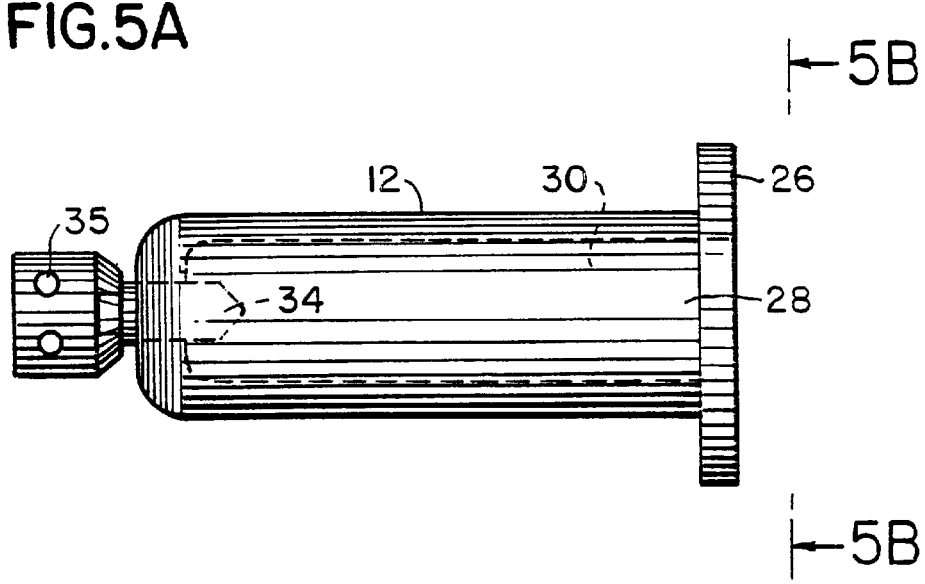
FIG. 5A is a schematic view of the bushing well of FIG. 3.
Figure 5B:
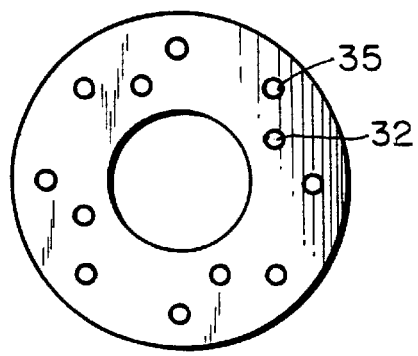
FIG. 5B is a front view of the lip of the bushing well of FIG. 5A showing the attachment bores.

FIGS. 5A and 5B depict the bushing well 12 of FIGS. 3 and 4, and the offset bores 32 and 35 through lip 26 for attachment to flange 18 and to mounting boss 37, respectively.

FIG. 6 shows a coupler of the present invention in place in a power transformer having sets of four bushing wells 12 to accommodate grounded three-phase electrical connections. In other preferred embodiments, single phase or other types of electrical connections may be used, requiring multiple sets of one to six, or more, bushing wells. In the present embodiment, bushings 10 are shown in a first set of bushing wells 12 in the power transformer housing 52. A second set of bushing wells 12 on a second face of the power transformer housing 52 are not in use, and thus do not contain bushings 10. Instead, well caps 44 are placed over these bushing wells 12. Each well cap 44 is mounted to lip 26, preferably via bores 32 and with the same bolting means otherwise used to join the bushings 10 to wells 12. Alternatively, each well cap 44 may be secured to lip 26 by conventional means, provided such means do not disturb the placement of the bushing well in the aperture of the power transformer housing.

The bushing assembly 10 of FIG. 4 handles up to about 15 kV. It is anticipated that the assembly of the present invention can accommodate up to about 48 kV. Furthermore, in the prior art, power transformer connections typically required entry into the transformer environment, and thus, were not easily adjusted. While quick-disconnect connectors are known in the art of distribution transformers, these connectors are not designed to provide the current and voltage ratings necessary for use in a power transformer. Furthermore, the disclosed coupler design provides unique dielectric insulating properties not found in distribution connectors.

The invention having been thus described with particular reference to the preferred forms thereof, it will be obvious that various changes and modifications may be made therein without departing from the spirit and scope of the invention as defined in the appended claims.

What we claim is:

1. A coupling means for coupling a power transformer to a power source, comprising:
    a bushing well having a lip at a first end and a terminal at a second end, said lip abutting a wall of the power transformer such that said bushing well extends into the power transformer;
    a bushing having a circumferential flange, said circumferential flange abutting said lip when said bushing is inserted into said bushing well;
    means for connecting a first end of said bushing to said terminal; and
    an air gap sufficient to act as an insulator between said bushing and said bushing well.

2. The coupling means of claim 1, wherein said connecting means comprises a gripping end.

3. The coupling means of claim 2, wherein said gripping end further comprises biasing means for frictionally engaging said terminal.

4. A coupling means for coupling a power transformer to a power source, comprising:
    a bushing well having a lip at a first end and a terminal at a second end, said lip abutting a wall of the power transformer such that said bushing well extends into the power transformer;
    a bushing having a circumferential flange, said circumferential flange abutting said lip when said bushing is inserted into said bushing well;
    means for connecting a first end of said bushing to said terminal;
    an air gap sufficient to act as an insulator between said bushing and said bushing well;
    wherein said connecting means comprises a gripping end;
    wherein said gripping end further comprises biasing means for frictionally engaging said terminal; and wherein said biasing means is removable from said gripping end.

5. Means for coupling an electrical cable to a power transformer having a housing, the coupling means comprising:
    a bushing assembly having a bushing well and a bushing adapted to be received in said bushing well;
    means for attaching said cable to a first end of said bushing;
    means for attaching a second end of said bushing to a terminal mounted within said bushing well, wherein said bushing well extends into the housing of the power transformer, and wherein a gap remains between said bushing and said bushing well to provide insulation.

6. A power transformer having a housing with at least one aperture for receipt of at least one bushing assembly, said at least one bushing assembly comprising:
    a bushing well adapted to be secured in one of said at least one aperture of the housing, said bushing well having a terminal for conveying electricity between said power transformer and said bushing assembly;
    a bushing adapted to be connected to said terminal to permit the conducting of electric current between said terminal and said bushing;
    means for releasably coupling said bushing to said terminal; and
    wherein said bushing well and said bushing have therebetween an amount of air sufficient to function as insulation.

7. A power transformer having a housing with a plurality of apertures for receipt of a plurality of bushing assemblies, at least one of said plurality of bushing assemblies comprising:
    a bushing well adapted to be secured in one of said plurality of apertures of the housing, said bushing well having a terminal for conveying electricity between said bushing well and said power transformer;
    a bushing adapted to be connected to said bushing well to permit the conducting of electricity between said bushing and said terminal;
    means for releasably connecting said bushing to the terminal; and
    wherein said bushing well and said bushing have therebetween an amount of air sufficient to act as an adequate electrical insulator.

* * * * *